US005689704A

United States Patent [19]

Yoshida et al.

[11] Patent Number: 5,689,704

[45] Date of Patent: Nov. 18, 1997

[54] RECORDING MEDIUM, RECORDING/ PLAYBACK DEVICE WHICH USES COMMANDS IN CHARACTER STRING FORM FOR AUDIO SYSTEM CONTROL

[75] Inventors: Tadao Yoshida; Katsuya Hori, both of Kanagawa, Japan

[73] Assignee: Sony Corporation, Tokyo, Japan

[21] Appl. No.: 444,045

[22] Filed: May 18, 1995

Related U.S. Application Data

[62] Division of Ser. No. 206,535, Mar. 4, 1994, abandoned.

[51] Int. Cl.[6] .......... G06F 9/00

[52] U.S. Cl. .......... 395/615; 395/514 A

[58] Field of Search .......... 395/800, 615, 395/427, 514 A

[56] References Cited

U.S. PATENT DOCUMENTS

| | | | |
|---|---|---|---|
| 3,627,914 | 12/1971 | Davies | 348/722 |
| 4,305,131 | 12/1981 | Best | 395/152 |
| 5,117,407 | 5/1992 | Vogel | 369/30 |
| 5,228,015 | 7/1993 | Arbiter | 369/33 |
| 5,262,964 | 11/1993 | Bonsall | 364/514 |
| 5,388,264 | 2/1995 | Tobias | 395/650 |
| 5,414,859 | 5/1995 | Staudacher | 395/775 |
| 5,491,704 | 2/1996 | Duron | 371/40.1 |
| 5,581,687 | 12/1996 | Lyle | 395/326 |

*Primary Examiner*—Eric Coleman
*Attorney, Agent, or Firm*—Hill, Steadman & Simpson

[57] ABSTRACT

To make possible interactive control operations in a device such as a minidisc system which uses a recording medium on which character information can be recorded. There is provided a recording medium on which sound information and management information for managing recording and playback operations is recorded, and on which predetermined character string information is recorded as commands in a region of the management information in which character information can be recorded. And, a recording and playback device 30 is provided with command read-in means (3~10, 12, 21), which reads in commands from the disc 1, control means 11, which, according to the commands read in, executes control of operations as specified by those commands, and input-output means (16, 17, 19, 20), controlled by the control means 11, required to execute the operations indicated by the read in commands.

3 Claims, 11 Drawing Sheets

TOC data memory
Magnetic head device
RAM
Address decoder
EFM CIRC encoder/decoder
Memory CONTROLLER
Audio compression encoder/decoder
A/D
D/A
Audio input
Audio output
Optical head
RF Amp.
Thread
1.41Mbit/sec
0.3Mbit/sec
Servo circuit
System ontroller (CPU)
Display
Keys
30

FIG.3

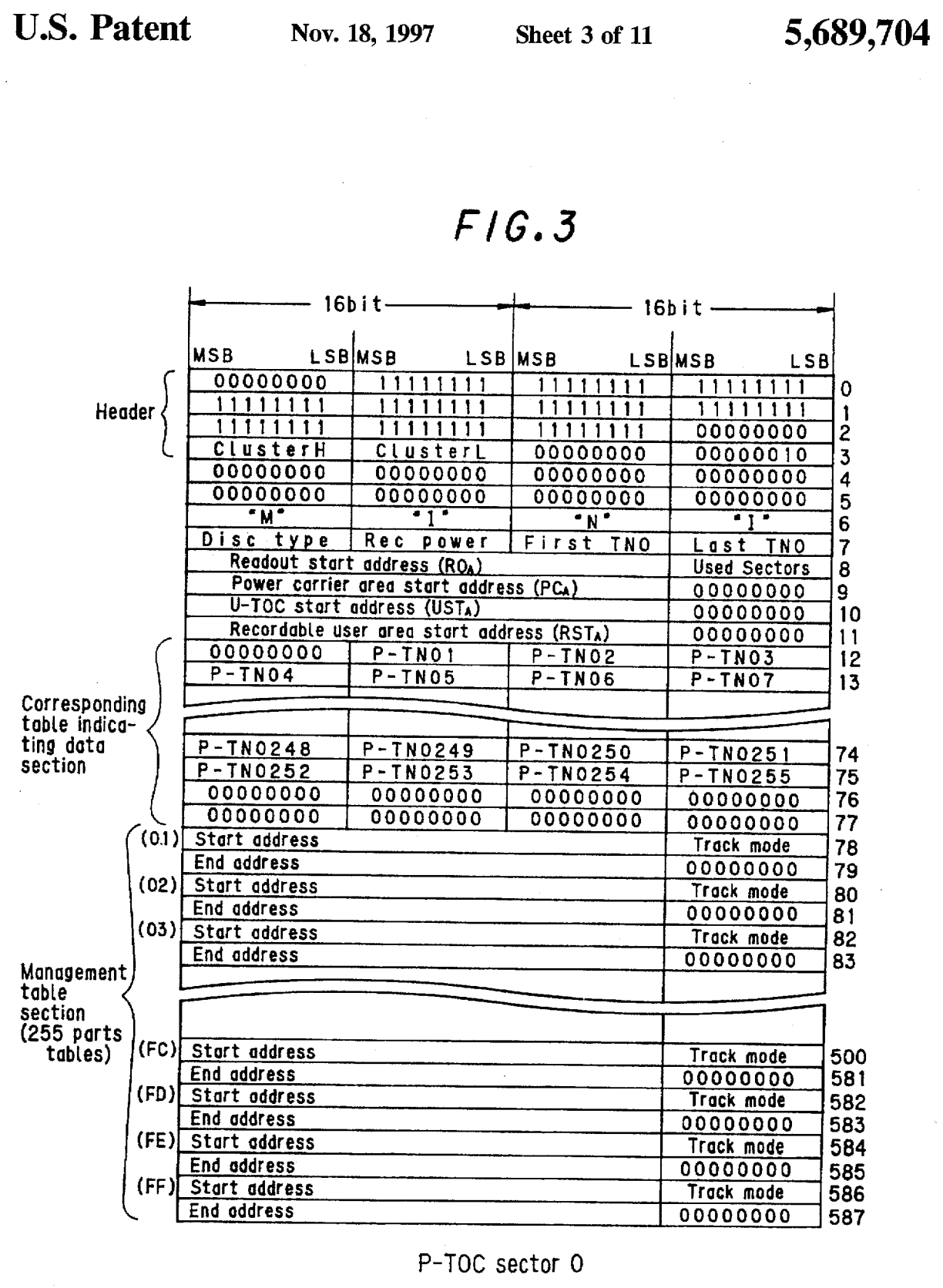

| | 16bit | | 16bit | | |
|---|---|---|---|---|---|
| | MSB LSB | MSB LSB | MSB LSB | MSB LSB | |
| Header | 00000000 | 11111111 | 11111111 | 11111111 | 0 |
| | 11111111 | 11111111 | 11111111 | 11111111 | 1 |
| | 11111111 | 11111111 | 11111111 | 00000000 | 2 |
| | ClusterH | ClusterL | 00000000 | 00000010 | 3 |
| | 00000000 | 00000000 | 00000000 | 00000000 | 4 |
| | 00000000 | 00000000 | 00000000 | 00000000 | 5 |
| | "M" | "I" | "N" | "I" | 6 |
| | Disc type | Rec power | First TNO | Last TNO | 7 |
| | Readout start address ($RO_A$) | | | Used Sectors | 8 |
| | Power carrier area start address ($PC_A$) | | | 00000000 | 9 |
| | U-TOC start address ($UST_A$) | | | 00000000 | 10 |
| | Recordable user area start address ($RST_A$) | | | 00000000 | 11 |
| Corresponding table indicating data section | 00000000 | P-TN01 | P-TN02 | P-TN03 | 12 |
| | P-TN04 | P-TN05 | P-TN06 | P-TN07 | 13 |
| | P-TN0248 | P-TN0249 | P-TN0250 | P-TN0251 | 74 |
| | P-TN0252 | P-TN0253 | P-TN0254 | P-TN0255 | 75 |
| | 00000000 | 00000000 | 00000000 | 00000000 | 76 |
| | 00000000 | 00000000 | 00000000 | 00000000 | 77 |
| Management table section (255 parts tables) (01) | Start address | | | Track mode | 78 |
| | End address | | | 00000000 | 79 |
| (02) | Start address | | | Track mode | 80 |
| | End address | | | 00000000 | 81 |
| (03) | Start address | | | Track mode | 82 |
| | End address | | | 00000000 | 83 |
| (FC) | Start address | | | Track mode | 500 |
| | End address | | | 00000000 | 581 |
| (FD) | Start address | | | Track mode | 582 |
| | End address | | | 00000000 | 583 |
| (FE) | Start address | | | Track mode | 584 |
| | End address | | | 00000000 | 585 |
| (FF) | Start address | | | Track mode | 586 |
| | End address | | | 00000000 | 587 |

P-TOC sector 0

FIG. 4

| Section | | 16bit: MSB … LSB | MSB … LSB | 16bit: MSB … LSB | MSB … LSB | |
|---|---|---|---|---|---|---|
| Header | | 00000000 | 11111111 | 11111111 | 11111111 | 0 |
| | | 11111111 | 11111111 | 11111111 | 11111111 | 1 |
| | | 11111111 | 11111111 | 11111111 | 00000000 | 2 |
| | | ClusterH | ClusterL | 00000001 | 00000010 | 3 |
| | | 00000000 | 00000000 | 00000000 | 00000000 | 4 |
| | | 00000000 | 00000000 | 00000000 | 00000000 | 5 |
| | | "M" | "I" | "N" | "I" | 6 |
| | | Disc type | 00000000 | 00000000 | 00000000 | 7 |
| | | 00000000 | 00000000 | 00000000 | 00000000 | 8 |
| | | 00000000 | 00000000 | 00000000 | 00000000 | 9 |
| | | 00000000 | 00000000 | 00000000 | 00000000 | 10 |
| Corresponding table indicating data section | | 00000000 | 00000000 | 00000000 | 00000000 | 11 |
| | | 00000000 | P-TNA1 | P-TNA2 | P-TN 3 | 12 |
| | | P-TNA4 | P-TNA5 | P-TNA6 | P-TN 7 | 13 |
| | | | | | | |
| | | P-TNA248 | P-TNA249 | P-TNA250 | P-TNA251 | 74 |
| | | P-TNA252 | P-TNA253 | P-TNA254 | P-TNA255 | 75 |
| | | Disc name | | | | 76 |
| | | Disc name | | | | 77 |
| Character table section | (01) | Disc name / Track name | | | | 78 |
| | | Disc name / Track name | | | | 79 |
| | (02) | Disc name / Track name | | | | 80 |
| | | Disc name / Track name | | | | 81 |
| | (03) | Disc name / Track name | | | | 82 |
| | | Disc name / Track name | | | | 83 |
| | | | | | | |
| | (FE) | Disc name / Track name | | | | 584 |
| | | Disc name / Track name | | | | 585 |
| | (FF) | Disc name / Track name | | | | 586 |
| | | Disc name / Track name | | | | 587 |

P-TOC sector 1

FIG.5

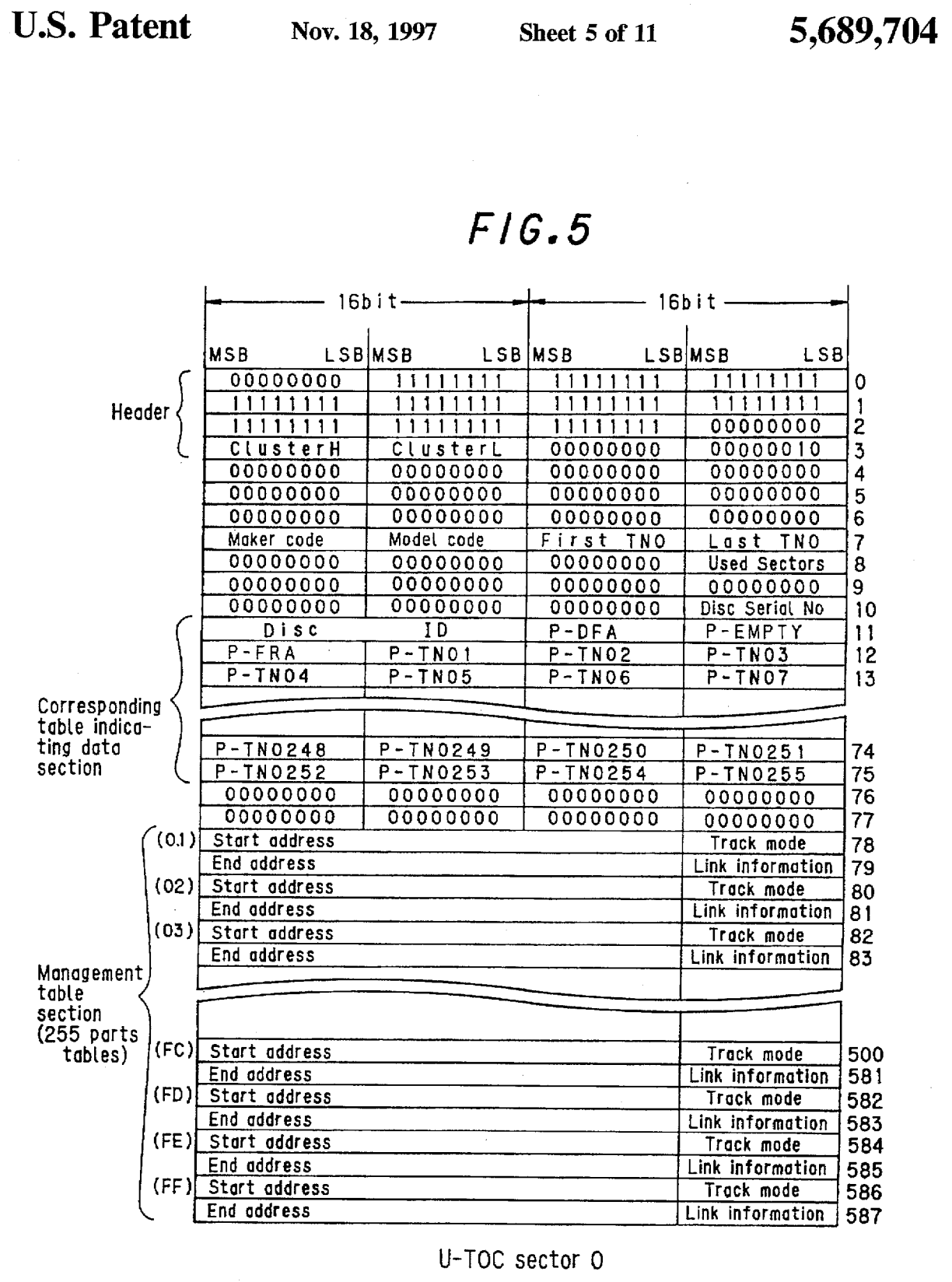

| Section | Part | 16bit: MSB LSB | MSB LSB | 16bit: MSB LSB | MSB LSB | Row |
|---|---|---|---|---|---|---|
| Header | | 00000000 | 11111111 | 11111111 | 11111111 | 0 |
| | | 11111111 | 11111111 | 11111111 | 11111111 | 1 |
| | | 11111111 | 11111111 | 11111111 | 00000000 | 2 |
| | | ClusterH | ClusterL | 00000000 | 00000010 | 3 |
| | | 00000000 | 00000000 | 00000000 | 00000000 | 4 |
| | | 00000000 | 00000000 | 00000000 | 00000000 | 5 |
| | | 00000000 | 00000000 | 00000000 | 00000000 | 6 |
| | | Maker code | Model code | First TNO | Last TNO | 7 |
| | | 00000000 | 00000000 | 00000000 | Used Sectors | 8 |
| | | 00000000 | 00000000 | 00000000 | 00000000 | 9 |
| | | 00000000 | 00000000 | 00000000 | Disc Serial No | 10 |
| Corresponding table indicating data section | | Disc | ID | P-DFA | P-EMPTY | 11 |
| | | P-FRA | P-TN01 | P-TN02 | P-TN03 | 12 |
| | | P-TN04 | P-TN05 | P-TN06 | P-TN07 | 13 |
| | | | | | | |
| | | P-TN0248 | P-TN0249 | P-TN0250 | P-TN0251 | 74 |
| | | P-TN0252 | P-TN0253 | P-TN0254 | P-TN0255 | 75 |
| | | 00000000 | 00000000 | 00000000 | 00000000 | 76 |
| | | 00000000 | 00000000 | 00000000 | 00000000 | 77 |
| Management table section (255 parts tables) | (01) | Start address | | | Track mode | 78 |
| | | End address | | | Link information | 79 |
| | (02) | Start address | | | Track mode | 80 |
| | | End address | | | Link information | 81 |
| | (03) | Start address | | | Track mode | 82 |
| | | End address | | | Link information | 83 |
| | | | | | | |
| | (FC) | Start address | | | Track mode | 500 |
| | | End address | | | Link information | 581 |
| | (FD) | Start address | | | Track mode | 582 |
| | | End address | | | Link information | 583 |
| | (FE) | Start address | | | Track mode | 584 |
| | | End address | | | Link information | 585 |
| | (FF) | Start address | | | Track mode | 586 |
| | | End address | | | Link information | 587 |

U-TOC sector 0

FIG.6

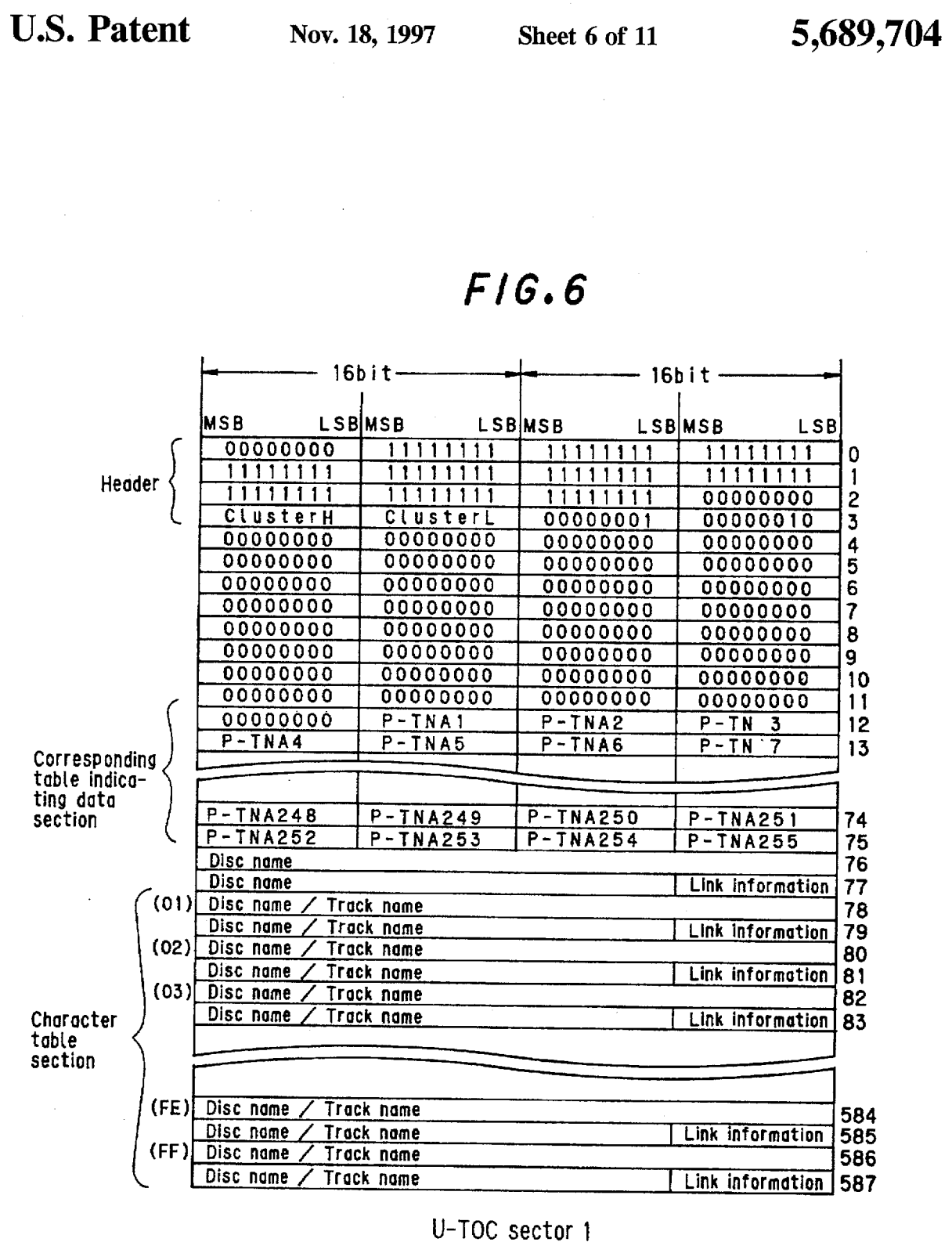

| Section | 16bit: MSB – LSB | 16bit: MSB – LSB | 16bit: MSB – LSB | 16bit: MSB – LSB | Row |
|---|---|---|---|---|---|
| Header | 00000000 | 11111111 | 11111111 | 11111111 | 0 |
| Header | 11111111 | 11111111 | 11111111 | 11111111 | 1 |
| Header | 11111111 | 11111111 | 1111111 | 00000000 | 2 |
| Header | ClusterH | ClusterL | 00000001 | 00000010 | 3 |
| | 00000000 | 00000000 | 00000000 | 00000000 | 4 |
| | 00000000 | 00000000 | 00000000 | 00000000 | 5 |
| | 00000000 | 00000000 | 00000000 | 00000000 | 6 |
| | 00000000 | 00000000 | 00000000 | 00000000 | 7 |
| | 00000000 | 00000000 | 00000000 | 00000000 | 8 |
| | 00000000 | 00000000 | 00000000 | 00000000 | 9 |
| | 00000000 | 00000000 | 00000000 | 00000000 | 10 |
| | 00000000 | 00000000 | 00000000 | 00000000 | 11 |
| Corresponding table indicating data section | 00000000 | P-TNA1 | P-TNA2 | P-TN 3 | 12 |
| Corresponding table indicating data section | P-TNA4 | P-TNA5 | P-TNA6 | P-TN 7 | 13 |
| | | | | | |
| Corresponding table indicating data section | P-TNA248 | P-TNA249 | P-TNA250 | P-TNA251 | 74 |
| Corresponding table indicating data section | P-TNA252 | P-TNA253 | P-TNA254 | P-TNA255 | 75 |
| | Disc name | | | | 76 |
| | Disc name | | | Link information | 77 |
| Character table section (01) | Disc name / Track name | | | | 78 |
| Character table section | Disc name / Track name | | | Link information | 79 |
| Character table section (02) | Disc name / Track name | | | | 80 |
| Character table section | Disc name / Track name | | | Link information | 81 |
| Character table section (03) | Disc name / Track name | | | | 82 |
| Character table section | Disc name / Track name | | | Link information | 83 |
| | | | | | |
| Character table section (FE) | Disc name / Track name | | | | 584 |
| Character table section | Disc name / Track name | | | Link information | 585 |
| Character table section (FF) | Disc name / Track name | | | | 586 |
| Character table section | Disc name / Track name | | | Link information | 587 |

U-TOC sector 1

P-FRA= 03 start address
end address
link information
(03)
$S_{03}$
$E_{03}$
18

Figure 8:
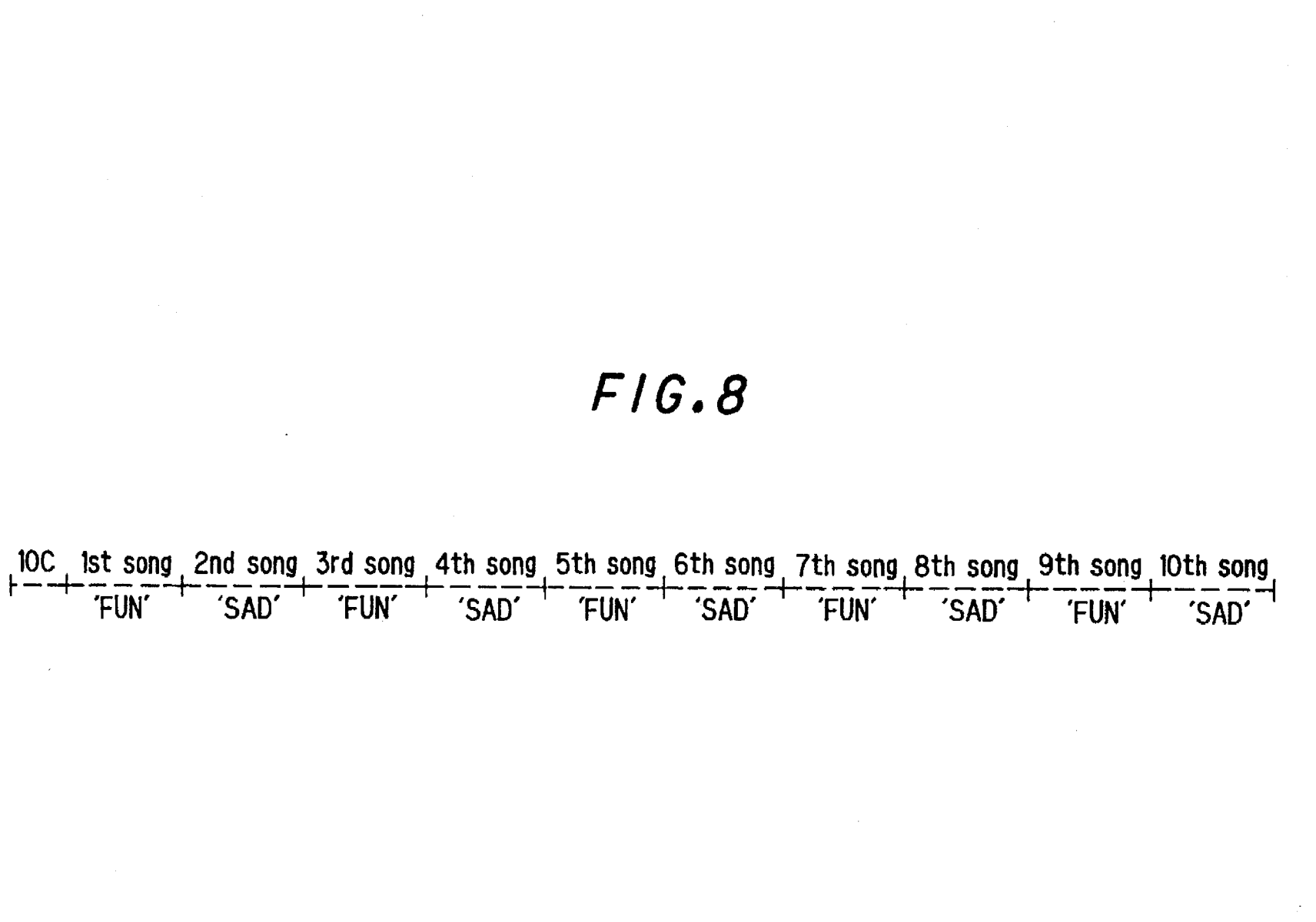

1st song 'FUN'

2nd song 'SAD'

3rd song 'FUN'

4th song 'SAD'

5th song 'FUN'

6th song 'SAD'

7th song 'FUN'

8th song 'SAD'

9th song 'FUN'

10th song 'SAD'

FIG. 9

00000000
2
P-TN2
P-TN3
12
Disc Name or Track Name
Link-P
79
"I" "F" " " "E"
80
"N" "D" " "
Link-P
81
"T" "H" "E" "N"
84
" " "T" "N" "O"
85
"3" 00h
86

Insert Disc
110
Push MD-I
64 Button
112
Reproduce
U-TOC Info
114
A ?
N
Y
116
B ?
118
Read Prog.
TNO-1 ON UTOC
120
Reproduce
Track No.1
122
Read Prog.
TNO-2 ON UTOC
128
Reproduce
Track No.2
130
124
TON1
End ?
N
Y
TON2
End ?
N
Y
132
End
126

RECORDING MEDIUM, RECORDING/PLAYBACK DEVICE WHICH USES COMMANDS IN CHARACTER STRING FORM FOR AUDIO SYSTEM CONTROL

This is a divisional, of application Ser. No. 08/206,535, filed Mar. 4, 1994 abandoned.

DETAILED DESCRIPTION OF THE INVENTION

This invention relates to recording media, such as for example discs and tapes, and to recording devices and reproduction devices for use with these recording media.

BACKGROUND OF THE INVENTION

As reproduction devices which can reproduce for example music and speech, etc., recording media such as optical discs, optical-magnetic discs and magnetic tape, which record audio signals as digital signals, are widely used, and are known as compact discs, or DAT (digital audio tape), etc.

In particular, recently, an optical-magnetic disc (the so-called minidisc) with which not only is reproduction possible but also it is possible for the user to record sounds, such as pieces of music, has been developed.

In this minidisc system, as the recording media, there are optical-magnetic discs, with which user recording/playback is possible, optical discs, on which pieces of music or the like are prerecorded as bit information and which are designated as being for playback only (premastered type), and hybrid types, in which both of these are combined.

These are generally used for recording audio signals; however, in the case of the minidisc it is possible to record such information as the title of the disc (the album title) and the music titles of pieces of music prerecorded on the disc or of programs such as pieces of music, etc., recorded by the user, as character information, and it is possible for example during playback for the disc title and the music title, and the name of the artist, etc., to be displayed by a display part mounted on the playback device.

As an optical disc with which it is possible to enjoy games, music, and moving images, etc., interactively, CD-I (compact disc-interactive) is already known. However, in the structure of the data in CD-I, the program regions and the music and image data, etc., regions are intermixed, and there is no particular distinction between them.

In the case of minidisc and compact disc systems, there is no interactivity with respect to the disc, and a function which interactively controls the playback of recorded music and the like is not provided, as it is in the system known as CD-I (compact disc-interactive), and it is not possible for example for the user to set the order in which pieces of music are played through interaction with the recording medium.

It is noted that in the case of CD players and minidisc players, although, in what is called program playback, the order in which pieces of music are played can be specified by operation of the player, and audio signals can thereby be played in a desired order, this consists in providing the player each time with an order in which to access the pieces of music, and is strictly an operation control method of the player, and is not something that is performed by interaction with the recording member. Therefore, that control operation is not dependent on the recording medium, and for example control intended by the manufacturer of the recording medium is not performed.

SUMMARY OF THE INVENTION

This invention was devised in view of these kinds of problem, and aims to make possible interactive control operations, particularly in devices such as minidisc systems which use recording media on which character information can be recorded.

To this end, there is provided a recording medium on which management information for managing recording/playback operations is recorded together with one or a plurality of units of audio information, wherein the recording medium is further provided with a character recording region, in the management information, in which character information can be recorded, and predetermined character string information is recorded as commands in this character recording region.

Here, the character string information that constitutes the commands is made to be commands which control data recording operations, or data reproduction operations or editing operations in a recording device or a reproduction device for use with the recording medium, or display operations in a displaying means, or audio output operations not based on data reproduction.

Or, the character string information that constitutes the commands is made to be commands which control instruction input read-in operations, or audio input presence/absence or level detection operations, in a recording device or a reproduction device for use with the recording medium.

Or, the character string information that constitutes the commands is made to be commands which control variable substitution operations, or numerical logic computation operations, or built-in function computation operations or process flow judgment operations, with respect to a recording device or a reproduction device for use with the recording medium.

And, as a recording/reproduction device for use with this kind of recording medium, there is provided a construction comprising:

- command read-in means, for reading in character string information recorded as commands on the recording medium from the recording medium; control means, for, according to the character string information read in by the command read-in means, controlling the execution of those indicated operations; and
- input/output means, controlled by the control means, required for executing the operations indicated by the read-in character string information.

In a recording medium of which the format is established in such a way that character information which indicates the titles, etc., of audio information such as music can be recorded, it becomes possible for program commands to be recorded by making use of this region.

As the program commands, if their contents are established in advance, on the side of the recording/reproduction device which has read in the commands, it becomes possible for predetermined processing to be carried out according to those commands, and using the input/output means it is possible for the execution of control based on interaction between the recording medium and the user to be realized.

BRIEF DESCRIPTION OF THE DRAWINGS

FIG. 3 is a view illustrating the data structure of the P-TOC sector 0 which is read in by the recording and playback device of the embodiment.

FIG. 4 is a view illustrating the data structure of the P-TOC sector 1 which is read in by the recording and playback device of the embodiment.

FIG. 5 is a view illustrating the data structure of the U-TOC sector 0 which is read in by the recording and playback device of the embodiment.

FIG. 6 is a view illustrating the data structure of the U-TOC sector 1 which is read in by the recording and playback device of the embodiment.

FIGS. *7a*, *7b*, *7c*, *7d*, *7e* are a view illustrating the link structure of the data of the U-TOC sector 0 which is read in by the recording and playback device of the embodiment.

FIG. 8 is a view illustrating pieces of music recorded on the recording medium of the embodiment.

Figure 9:
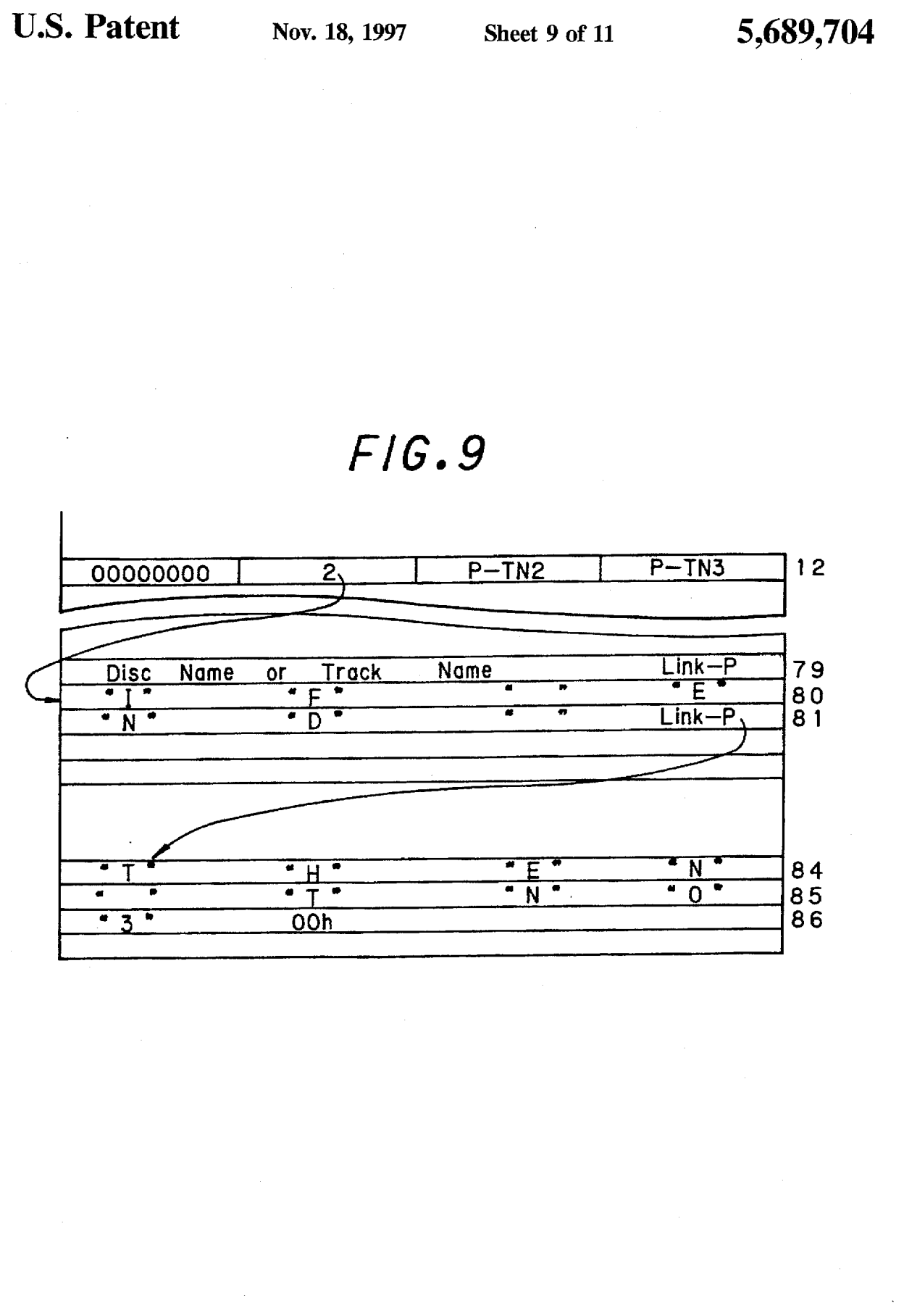

FIG. 9 is a view of a portion of a UTOC sector in which program information is written.

Figure 10:
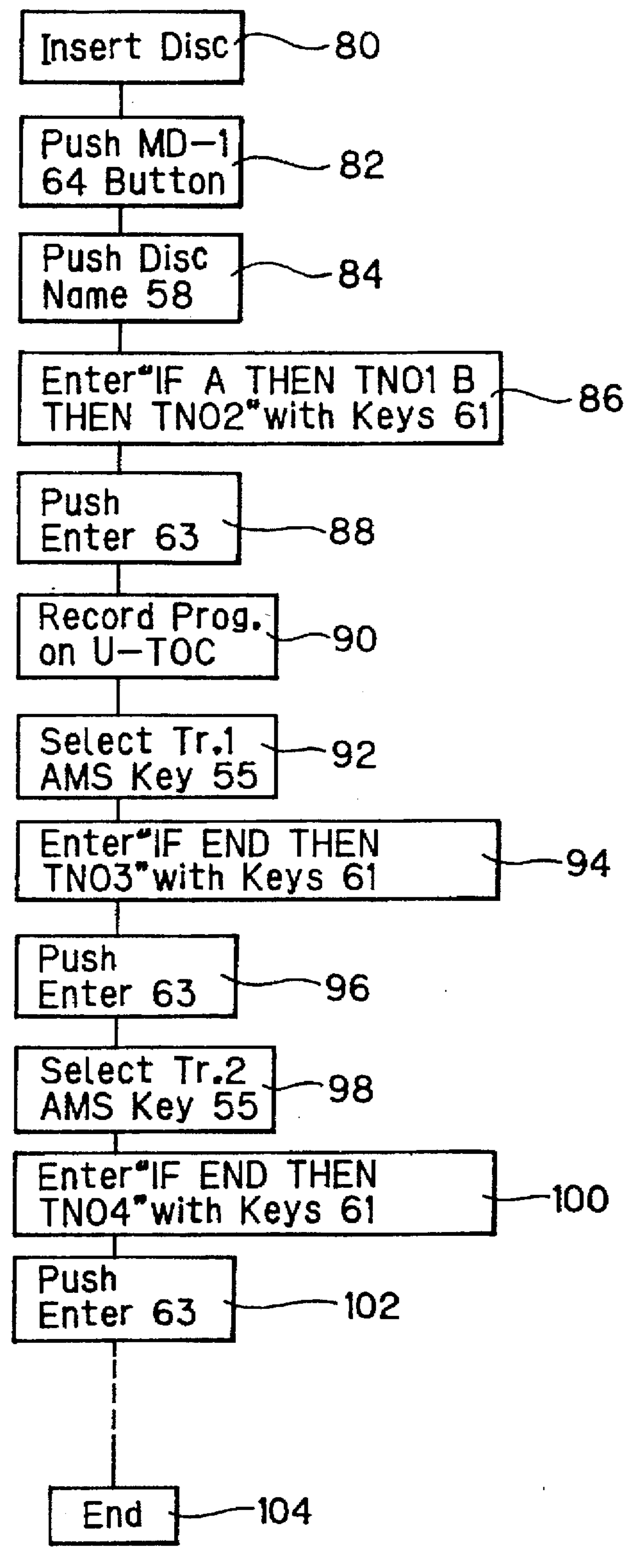

FIG. 10 is a flow chart illustrating writing program information by a user.

Figure 11:
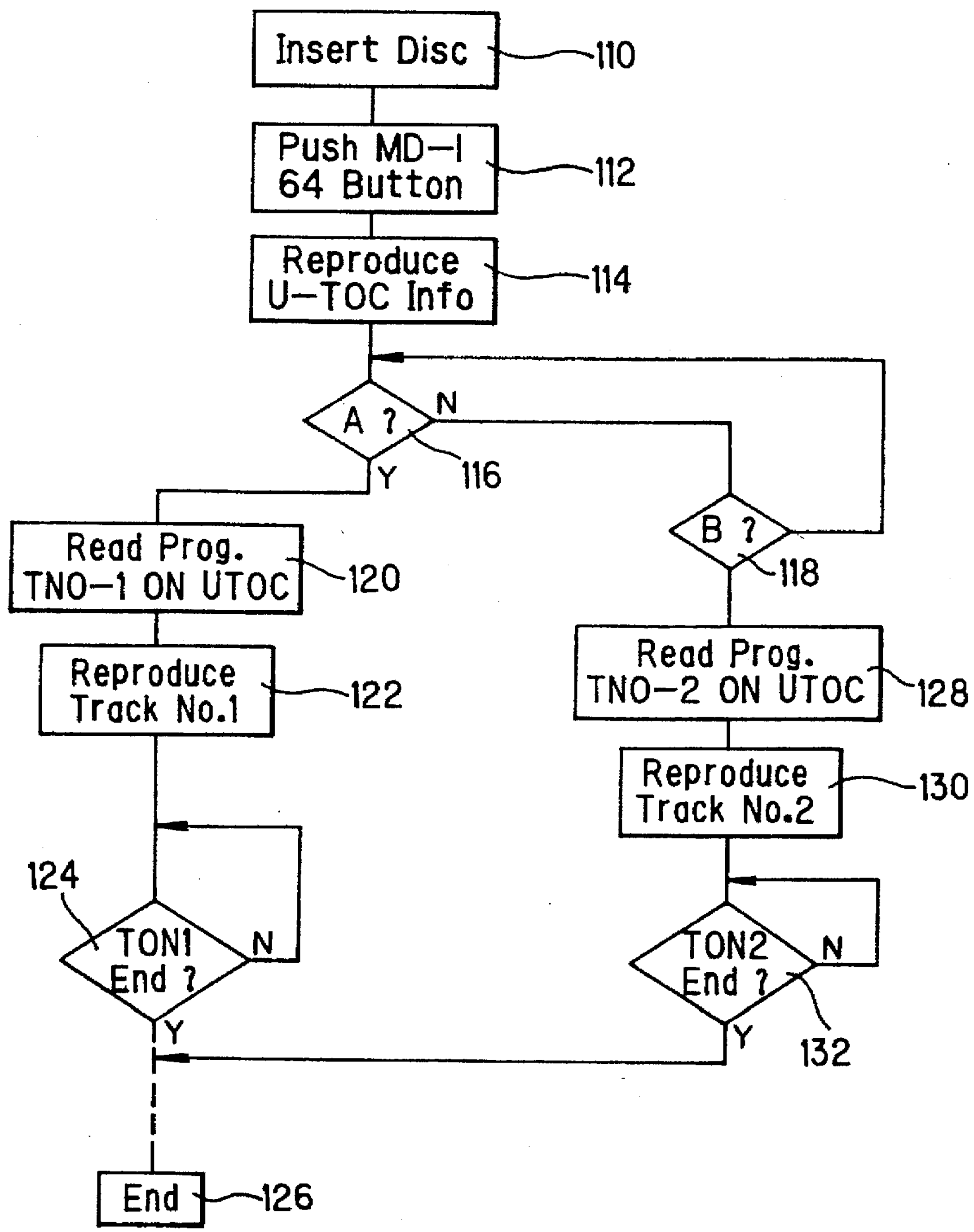

FIG. 11 is a flow chart illustrating execution of a user-written program.

DESCRIPTION OF THE PREFERRED EMBODIMENTS

Embodiments of the recording medium and the recording and playback device of the present invention will now be described.

Figure 1:
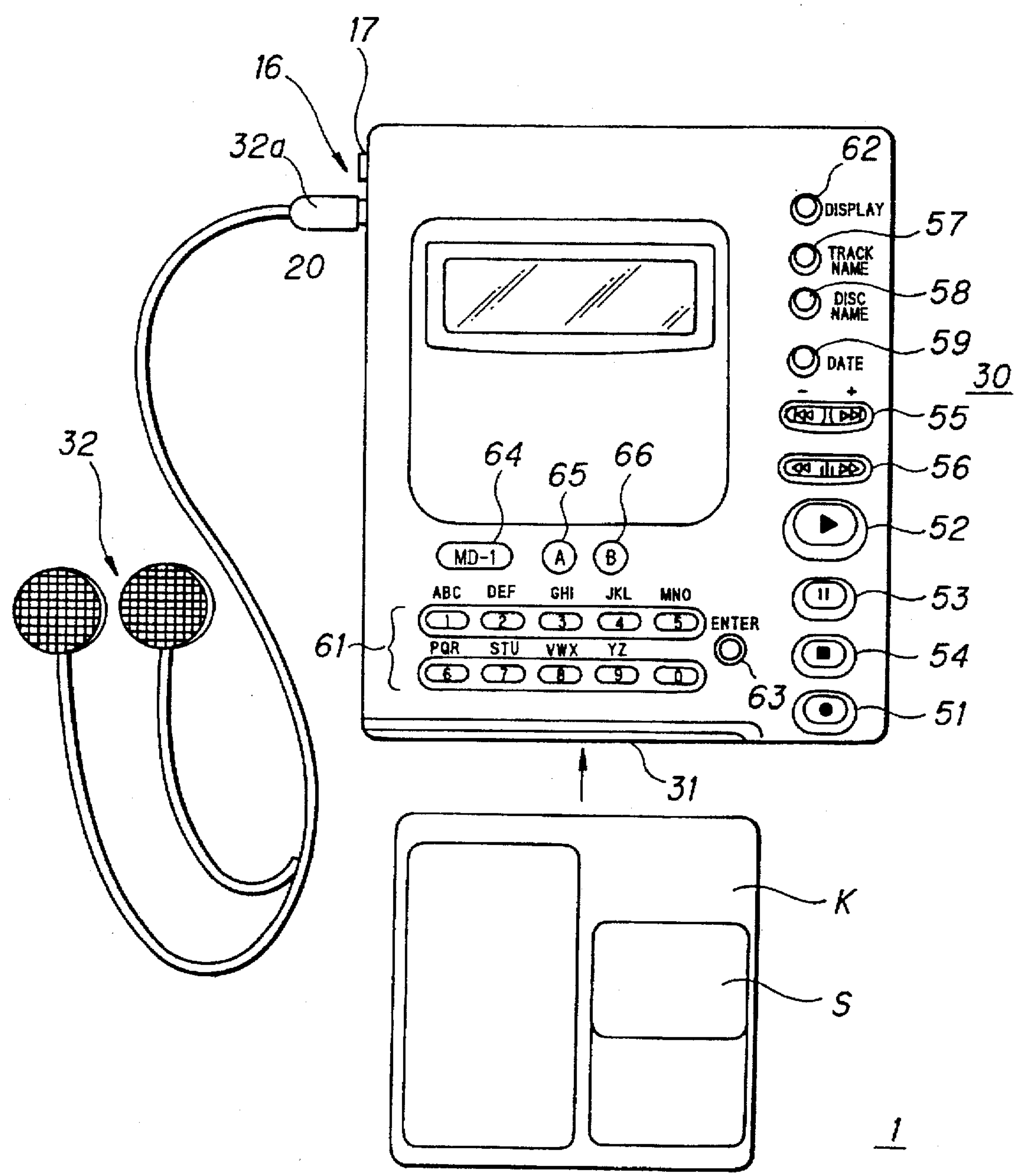
FIG. 1 is an external view of a recording medium and a recording and playback device according to an embodiment of the present invention.
Figure 2:
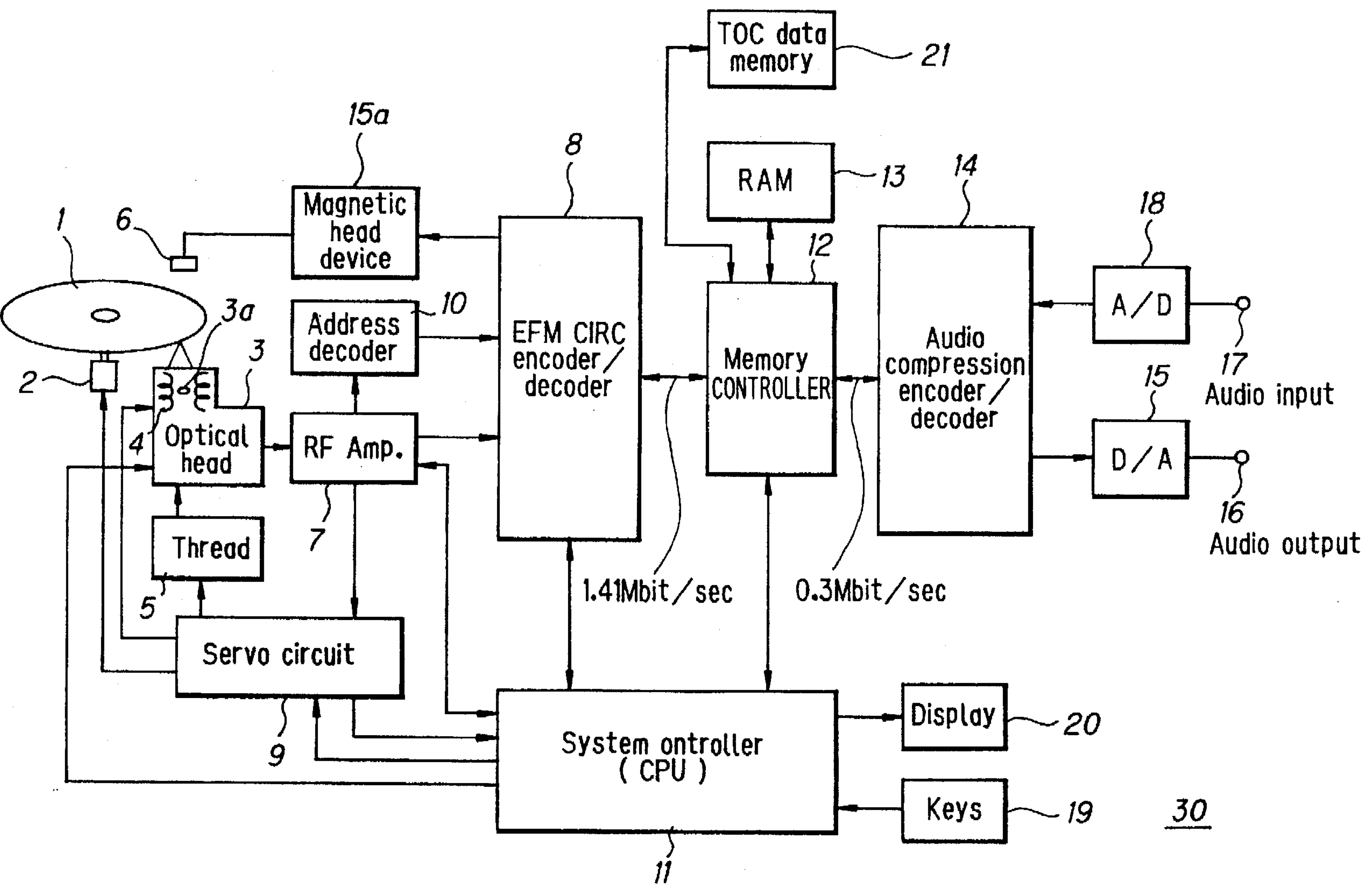
FIG. 2 is a block diagram of a recording and playback device according to the embodiment.

FIG. 1 is an exterior view of embodiments of a recording medium and a recording and playback device, and FIG. 2 is a view showing a block diagram of the essential parts of the recording and playback device.

FIG. 1 shows, as the recording medium of a minidisc system, an optical-magnetic disc (or an optical disc) on which for example a number of pieces of music (sound data) are recorded.

The optical disc or magnetic-optical disc is housed and rotated inside a cartridge K. Normally a shutter S is held in the position in which it is shown in the drawing, and the disc 1 inside the cartridge K is hidden from view; however, by this cartridge K being loaded into the recording and playback device 30 through an insertion slot 31, the shutter S is slid by an internal mechanism not shown in the drawing, and the recording surface of the disc 1 inside is exposed.

The recording and playback device 30 is provided with various input/output means on its outer case. For example, an audio signal input terminal 17, an audio signal output terminal, and a number of operating keys are provided as input means.

As operating keys, a recording key 51, a playback key 52, a pause key 53, a stop key 54, an AMS key 55, a search key 56, a music title input mode key 57, a disc title input mode key 58, a date input mode key 59, ten numeral keys 61, a display mode key 62, an enter key 63, an interactive mode key 64, and interaction keys 65, 66, etc., are mounted for operation by the user.

The numeral keys 61 each have three or two alphabet letters, or spaces, corresponding to them, and are used for character input.

And, as output means of the recording and playback device 30, an audio signal output terminal 16 is provided, and a display part 20, which displays various characters, numbers, and images, is also disposed in the surface of the upper part of the case.

For example a pair of earphones 32 is connected to the audio signal output terminal 16 by a plug 32*a*, and the outputted audio signal is outputted as sound.

As shown in FIG. 2, inside the recording and playback device 30 the optical-magnetic disc (or optical disc) 1 is floated and rotated by a spindle motor 2. Reference numeral 3 denotes an optical head which projects laser light onto the disc 1 during recording/playback, produces a high level laser output for heating the recording tracks up to the Curie temperature during recording on an optical-magnetic disc, and produces a relatively low level laser output for detecting data from light reflected by the magnetic Kerr effect during playback from an optical-magnetic disc.

It is noted that when the disc 1 is an optical disc on which data is recorded in pit form, as it is on a CD, the optical head 3 takes out a playback RF signal according to changes in the reflected light level caused not by the magnetic Kerr effect but by pit presence/absence in the same way as in the case of a CD. Of course, the magnetic field recording action that is discussed hereinafter is not carried out on optical discs.

In order to perform data readout from the disc 1 in this way, the optical head 3 is provided with an optical system having a laser diode as a laser output means, a deflection beam splitter and an objective lens, etc., and a detector for detecting reflected light. The objective lens 3*a* is held by a biaxial mechanism 4 in such a way that it can be moved in the radial direction of the disc and away from and toward the disc, and the entire optical head 3 is made movable in the radial direction of the disc by a thread mechanism 5.

Reference numeral 6 denotes a magnetic head which applies a magnetic field modulated by supplied data to the optical-magnetic disc and which is disposed in a position in which it faces the optical head 3 across the disc 1.

In the playback operation, the information detected from the disc 1 by the optical head 3 is supplied to an RF amplifier 7. By computation processing of the information supplied to it, the RF amplifier samples a playback RF signal, a tracking error signal, a focus error signal, absolute position information (absolute position information recorded on the optical-magnetic disc 1 as pre-grooves (wobbling grooves)), address information, subcode information, and a focus monitor signal, etc. The sampled playback RF signal is supplied to a data encoder/decoder section 8. The tracking error signal and the focus error signal are supplied to a servo circuit 9.

Also, the focus monitor signal is supplied to a system controller 11 comprising for example a microcomputer.

The servo circuit 9 generates various servo drive signals based on the tracking error signal and the focus error signal, and from access instructions, seek instructions, and rotational speed detection information, etc., from the system controller, and effects focus and tracking control by controlling the biaxial mechanism 4 and the thread mechanism 5, and also controls the spindle motor 2, maintaining it at a constant angular velocity (CAV) or a constant linear velocity (CLV).

The playback RF signal undergoes EFM (eight-fourteen modulation) demodulation and CIRC (cross-interleaved Reed-Solomon coding), etc., decoding processing in the encoder/decoder section 8, and is temporarily written into a buffer RAM 13 by a memory controller 12. The reading out of data from the magnetic-optical disc 1 by the optical head 3 and the transfer of the playback data from the optical head 3 to the buffer RAM 13 is performed at 1.41 Mbit/sec (intermittently).

The data written into the buffer RAM 13 is read out with timing such that the playback data is transferred at 0.3 Mbit/sec, and is supplied to an encoder/decoder section 14. It then undergoes playback signal processing such as audio expansion processing decoding processing, is converted into an analog signal by a D/A convertor 15, and is supplied through the terminal 16 to a predetermined amplifier circuit section and outputted for reproduction. It is outputted, for example, as L and R (left channel and right channel) audio signals.

Absolute position information, obtained by decoding pre-groove information and outputted from the address decoder 10, or address information recorded as data, is supplied through the encoder/decoder section 8 to the system controller 11 and used for various control operations.

A lock detection signal of the PLL circuit which produces bit lock of the recording/playback operation, and a monitor signal of the missing state of a frame synchronization signal of the playback data (L, R channels), are also supplied to the system controller 11.

When a recording operation is performed on the disc (optical-magnetic disc) 1, a recording signal (an analog audio signal) supplied to the connector 17 is converted into digital data by an A/D convertor 18 and then supplied to an encoder/decoder section 14 where it undergoes audio compression encoding processing. The recording data compressed by the encoder/decoder 14 is written by a memory controller 12 temporarily into a buffer RAM 13, and then with prescribed timing is read out again and sent to the encoder/decoder section 8. Then, after undergoing encoding processing, such as CIRC encoding and EFM modulation, in the encoder/decoder section 8, it is supplied to a magnetic head drive circuit 15*a*.

The magnetic head drive circuit 15a supplies a magnetic head drive signal to the magnetic head 6 according to the encoding-processed recording data. That is, it causes N or S magnetic field application to be performed on the optical-magnetic disc 1 by the magnetic head 6. Also, at this time the system controller 11 supplies a control signal to the optical head 3 instructing it to output laser light at the recording level.

Reference numeral 19 denotes an operation input section on which the keys for operation by the user are mounted, and reference numeral 20 denotes the display section mentioned above, constructed from for example a liquid crystal display.

The operation input section 19 comprises the various operation keys (recording key 51~interaction key 66) described above with reference to FIG. 1.

Reference numeral 21 denotes a RAM (referred to hereinafter as the TOC (table of contents) memory) which holds TOC information of the optical-magnetic disc 1.

As the discs used with the recording and playback device of this embodiment, as discussed above, there are the premastered type (optical discs), on which pieces of music or the like have been recorded in advance, rerecordable types, on which it is possible for the user to record audio data and the like (optical-magnetic discs), and hybrid types, which are provided with a ROM area, in which music or the like is prerecorded, and a recordable optical-magnetic area; on these discs, data for managing the areas on which data such as music has already been recorded and the as yet unrecorded areas, etc., is recorded, according to the disc type, as TOC information.

When the disc 1 has just been loaded into the device, or immediately before a recording or playback operation or the like, the system controller 11 activates the spindle motor 2 and the optical head 3, and causes the data in a TOC region set up for example near the innermost periphery of the disc 1 to be sampled. The TOC information is supplied through the RF amplifier 7 and the encoder/decoder section 8 to the memory controller 12 and stored in a TOC memory 21, and thereafter is used in the control of recording/playback operations performed on the disc 1.

For example, when some piece of music is to be recorded, as yet unrecorded areas of the disc 1 can be located from the user TOC (a TOC information region which can be rewritten as necessitated by audio signal recording, erasing, etc.), which is a section of the TOC information, and audio data can be recorded on these areas. And, when playback is to be performed, the area where the piece of music to be played back is recorded is determined from the TOC information, and that area is accessed and playback is performed.

The structure of the TOC information is shown in FIGS. 3~6. FIG. 3 shows a data region (hereinafter referred to as the P-TOC sector 0, for pre-mastered table of contents) in which mainly TOC information relating to music and the like which was recorded on the disc in advance (ROM information) is recorded; FIG. 4 shows a data region (hereinafter referred to as the P-TOC sector 1) in which character data such as the titles of pieces of music and the like recorded on the disc in advance, and the title of the disc, are recorded; FIG. 5 shows a data region (hereinafter referred to as the U-TOC sector 0, for user table of contents) in which mainly TOC information relating to pieces of music that the user has recorded and as yet unrecorded areas which can be newly recorded is recorded; and FIG. 6 shows a data region (hereinafter referred to as the U-TOC sector 1) in which character data relating to pieces of music that the user has recorded, such as song titles and disc titles, written in by the user, is recorded.

As the P-TOC format, areas are provided for sector 0~sector 4, and sector 1 and subsequent sectors are used as necessary.

As the U-TOC format, areas are provided for sector 0~sector 4, and sector 1 and subsequent sectors are used as necessary. Of course, U-TOC is not provided in premastered discs.

The data regions of FIGS. 3~6 are each constructed as data regions of for example 4 bytes, and are provided with headers having synchronization patterns made up of 1 byte data of all 0's or all 1's, and addresses, in their top positions, to show that they are TOC regions.

In the P-TOC sector 0 of FIG. 3, in predetermined address positions following the header, the track number of the first piece of music recorded (First TNO), the track number of the last piece of music recorded (Last TNO), the read out start address ROA, the power carrier area start address PCA, the U-TOC (the data region U-TOC sector 0 of FIG. 5) start address USTA, and the recordable area start address RSTA, etc., are recorded, and following that there is provided a corresponding table indicating data section containing table pointers (P-TNO1~P-TNO255) which correspond the recorded pieces of music, etc., with parts tables in a management table section which is discussed below.

In the region following the corresponding table indicating data section, there is provided a management table section containing 255 parts tables, (01h)~(FFh), in hexadecimal rotation, corresponding to the table pointers (P-TNO1~P-TNO255) of the corresponding table indicating data section. In each parts table it is possible for, for a certain segment (in this case, a segment is a track portion of the track on the disc in which data has been physically continuously recorded), the start address, which is the start point, and the end address, which is the end point, and the mode information of that segment (track) to be recorded.

In the track mode information in each parts table, information as to for example whether or not that segment has been set to overwrite prohibited or copying prohibited, and whether the recorded information is audio information or not, and its monaural/stereo classification, etc., is recorded.

In each of the parts tables (01h)~(FFh) in the management table section, by the table pointers (P-TNO1~P-TNO255) of the corresponding table indicating data section, the contents of that segment are shown. That is, for the first piece of music a certain parts table (for example (01); however, in practice, by predetermined computation processing the table pointer is showing a certain parts table by a figure for which a byte position in the P-TOC sector 0 is indicated) is recorded as table pointer P-TN01, and in this case the start address of the parts table (01) becomes the start address of the position where the first piece of music is recorded, and similarly the end address becomes the end address of the position where the first piece of music is recorded.

Also, the track mode information becomes information relating to the first piece of music.

Similarly, for the second track, in the parts table indicated by the table pointer P-TNO2 (for example (02)), the start address and the end address of the recorded position of the second piece of music, and the track mode information of the second piece of music, are recorded.

And similarly thereafter because track pointers are provided up to P-TNO255, P-TOC management is possible up to the 255th piece of music.

By means of the P-TOC sector 0 being formed in this way, for example when playback is to be performed, it is possible to access and play back a prescribed piece of music.

In the P-TOC sector 1 of FIG. 4, character information corresponding to the disc and pieces of music prerecorded on the disc and managed by the P-TOC sector 0 as described above can be recorded.

That is, in the same way as the table pointers (P-TNO1~P-TNO255) in the P-TOC sector 0 described above, table pointers (P-TNA1~P-TNA255) corresponding to the recorded pieces of music (up to the 255th piece of music) are provided as a character table indicating data section, and a table in which the disc name (title) is recorded, and a character table section made up of 255 parts tables, (01)~(FF), specified by the table pointers (P-TNA1~P-TNA255), in which disc names or track names (music titles) are recorded, are provided.

Album titles and titles of pieces of music and the like are recorded in the parts tables of the character table section according to ASCII codes. By the parts tables in which the character information is recorded being specified by the table pointers (P-TNA1~P-TNA255), it is known what piece of music it is to which the character information corresponds. For example, the name of the first piece of music can be recorded in the parts table specified by the table pointer P-TNA1.

It is noted that although a drawing and description of it are omitted here, the P-TOC sector 4 also is constructed in such a way that character information can be recorded in much the same form as in the P-TOC sector 1.

Also, with respect to this kind of P-TOC, in the case of optical-magnetic discs on which no premastered music data is recorded, the management information for each piece of music unit is all made 00's, and music management is performed by the U-TOC described below.

In the data region shown in FIG. 5, i.e. the U-TOC sector 0, in predetermined address positions following the header, data such as a marker code, a model code, the music number of the first piece of music (First TNO), the music number of the last piece of music (Last TNO), the sector use situation, a disc serial number, and a disc ID are recorded, and also there is provided a region in which various table pointers (P-DFA—for defective area, P-EMPTY, P-FRA—for free area, P-TNO1~P-TNO255) are recorded as a corresponding table indicating data section for identifying regions occupied by pieces of music recorded by the user and as yet unrecorded regions, etc., by corresponding them with management data described hereinafter.

And, as a management table section, 255 parts tables, (01) to (FF), corresponding to the table pointers (P-DFA~P-TNO255) of the corresponding table indicating data section, are provided, and in each parts table, in the same way as in the P-TOC sector 0 of FIG. 3 described above, for a certain segment, a start address, that becomes the starting point, and an end address, that becomes the end point, and the mode information for that segment, are recorded, and, in the case of this U-TOC sector 0, because there are cases in which the segment corresponding to a parts table is consecutively linked to another segment, link information showing the parts table in which the start address and the end address of the segment to which that segment is to be linked can also be recorded.

In the case of the Minidisc, because for example even if the data of one piece of music is recorded physically discontinuously, i.e. over several segments, there is nothing to prevent playback being carried out by accessing between segments from one segment to the next, pieces of music, etc., recorded by the user, in order to use the recordable area efficiently, are sometimes recorded over several segments. To this end, link information is provided in such a way that by for example using the numbers (01)~(FF) assigned to the parts tables (in practice indicated by prescribed computation processing by a figure which can show a byte position in the U-TOC sector 0) to specify the parts tables to be linked, the parts tables can be linked. (It is noted that because prerecorded pieces of music and the like are not normally divided up into different segments, the link information is all made 00's as in the TOC sector 0 of FIG. 3.)

That is, in the management table section of the U-TOC sector 0, one parts table expresses one segment, and for example in the case of a piece of music which is made up of three segments linked together, the management of those segment positions is performed by 3 parts tables linked together by link information.

The contents of the segments of the parts tables (01)~(FF) of the management table section in the U-TOC sector-O are indicated by the table pointers (P-DFA, P-EMPTY, P-FRA, P-TNO1~P-TNO255) in the corresponding table indicating data section as described below.

The table pointer P-DFA indicates flawed regions in the optical-magnetic disc 1, and specifies one parts table or the first of a plurality of parts tables in which portions of track (=segments) that have become flawed regions due to scratches or the like are shown. That is, when a flawed region exists, one of the parts tables (01)~(FF) is recorded in the table pointer P-DFA, and the flawed segment is shown by its start and end addresses in that parts table. And, when there is another flawed segment, the link information in that parts table specifies another parts table, and a flawed segment is shown in that other parts table also. When there are no other flawed segments, the link information is made for example (00)'s, indicating that there are no further links.

The table pointer P-EMPTY indicates one or the first of a plurality of as yet unused parts tables in the management table section; when unused parts tables exist, one of the parts tables (01)~(FF) is recorded as the table pointer P-EMPTY. When a plurality of unused parts tables exist, these parts tables are specified one after another by link information, starting with the parts table specified by the table pointer P-EMPTY, and all the unused parts tables are linked in this way in the management table section.

For example, in a disc on which there is no recorded audio data, such as pieces of music, recorded whatsoever, and which also has no flaws, because the pans tables are all unused, for example the parts table (01) is specified by the table pointer P-EMPTY and the parts table (02) is specified by the link information in the parts table (01), the parts table (03) is specified by the link information in the parts table (02), and in this way the parts tables up to the parts table (FF) are all linked. In this case, the link information in the parts table (FF) is made (00)'s, indicating that there are no further links.

The table pointer P-FRA indicates as yet unrecorded areas (including erased areas) of the optical-magnetic disc 1 where data can be written, and specifies one or the first of a plurality of parts tables in which as yet unrecorded track portions (=segments) are shown. That is, when an as yet unrecorded area exists, one of the parts tables (01)~(FF) is recorded in the table pointer P-FRA, and a segment that is an as yet unrecorded area is shown in that parts table by its start and end addresses. And, when there are a plurality of such segments, in other words when there are a plurality of parts tables indicating such segments, these parts tables are indicated one after another by link information until a parts table whose link information is (00)'s is reached.

Figures 7A, 7B, 7C, 7D, 7E:
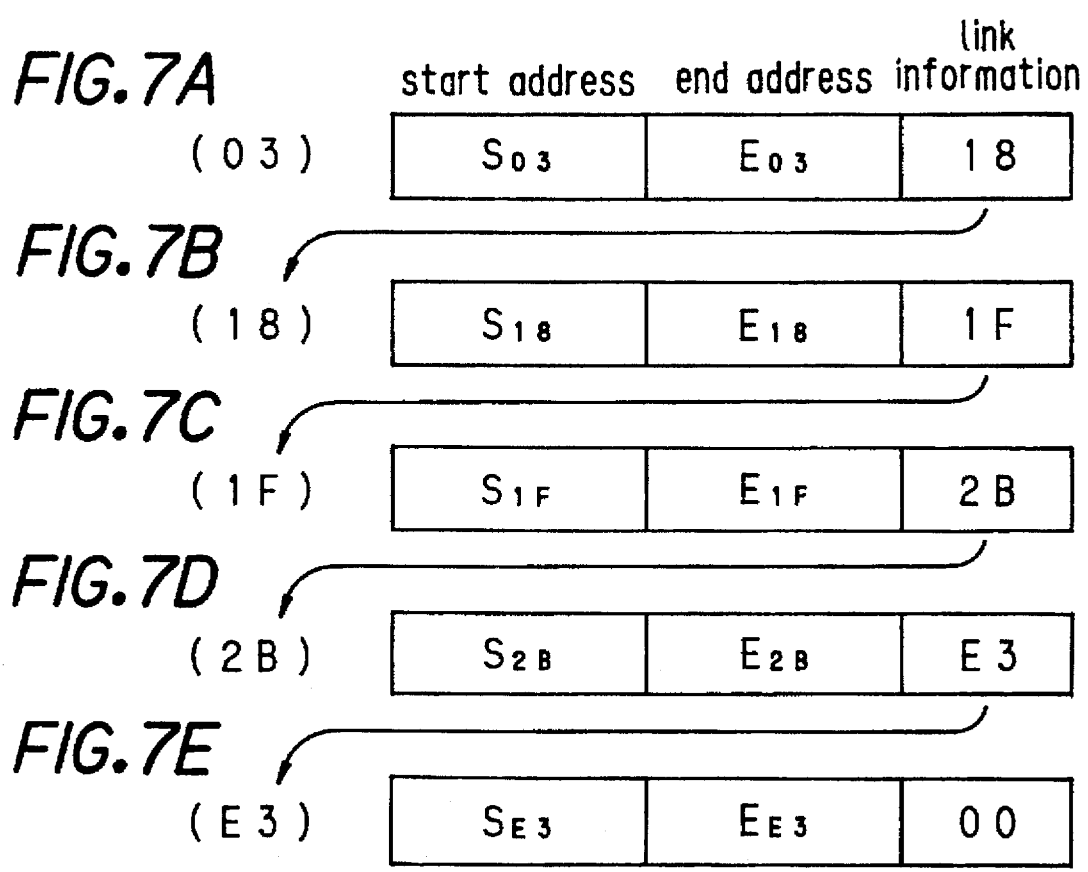

The state of the management of the as yet unrecorded segments by the parts tables is shown schematically in FIG. 7. This diagram shows the situation as it is when the segments (03) (18) (1F) (2B) (E3) are designated as unrecorded regions and this state is being expressed by the corresponding table indicating data P-FRA and the links of the parts tables (03) (18) (1F) (2B) (E3). The morphology of the management of the flawed areas and the unused areas discussed above also is similar to this.

The table pointers P-TNO1~P-TNO255 indicate pieces of music that the user has recorded on the optical-magnetic disc 1, and for example table pointer P-TNO1 specifies a parts table in which one segment or the chronologically first of a plurality of segments in which the first piece of music is recorded is shown.

When for example the piece of music designated as the first piece of music is recorded on the disc without being divided up (in other words is recorded in one segment), the recording area of that one piece of music is stored as the start address and end address indicated by the table pointer P-TNO1.

And, when for example the piece of music designated as the second piece of music is recorded on the disc discretely over a plurality of segments, in order to show the recording positions of that piece of music the segments are specified according to their chronological order. That is, from the parts table specified by the table pointer P-TNO2, the other parts tables are specified in their chronological order by link information, and the parts tables are linked together until a parts table whose link information is (00)'s is reached (in the same way as that shown in FIG. 7). In this way, by all the segments in which data constituting for example the second piece of music is recorded being specified in order, using the data of the U-TOC sector-0, at times such as when the second piece of music is played, or when the area where the second piece of music is recorded is overwritten, the optical head 3 and the magnetic head 6 are made to access the discrete segments and continuous music information can thereby be played back from the discrete segments and recording in which the recording area is used efficiently becomes possible.

In the region of the U-TOC sector 1 of FIG. 6, character information corresponding to each of the user-recorded pieces of music managed by the U-TOG sector-0 can be recorded.

That is, in the same way as the table pointers (P-TNO1~P-TNO255) in the U-TOG sector-0, table pointers (P-TNA1~P-TNA255) corresponding to the recorded pieces of music (up to the 255th piece of music) are provided as a character table indicating data section, and a table in which the disc name (title) can be recorded and a character table section consisting of 255 parts tables, (01)~(FF), specified by the table pointers (P-TNA1~P-TNA255), in which the disc name and the track names (music titles) are recorded, are provided.

In the parts tables of the character table section, album titles and music titles, etc., are recorded in ASCII code. By the parts tables in which the character information is recorded being specified by the table pointers (P-TNA1~P-TNA255), it is known what piece of music it is to which the character information corresponds. For example, the title of the first piece of music can be recorded in the parts table specified by the table pointer P-TNA1.

Because the U-TOC sector 1 region, which holds, in correspondence with the pieces of music, etc., recorded by the user, character information such as the titles and disc names (album titles) of those pieces of music, is provided in this way, for pieces of music recorded by the user also it is possible to write in song titles, etc., to go with the pieces of music. For example, by the user inputting alphabet character information by operating the ten keys 61 of the operating section 19 at the time of recording, or at some other time, that character information is written into the TOC region of the optical-magnetic disc 1.

It is noted that although a drawing and description of it are omitted here, the U-TOC sector 4 also is constructed in such a way that character information can be recorded in much the same form as in the U-TOC sector 1.

It is noted here that when the string of characters inputted by the user is of a length such that it can not be recorded in one parts table only, it is recorded over a plurality of parts tables and this state is managed by link information.

Of these TOC information sectors, in P-TOC sector 0~P-TOC sector 4, because data rewriting is not necessary, the data is recorded on the disc as ROM data; in U-TOC sector 0~U-TOC sector 4, on the other hand, because it is necessary for data to be rewritten each time the user carries out recording or erasing, etc., the data is recorded on the disc as optical-magnetic data.

A recording and playback device according to this embodiment, for use with optical-magnetic discs (or optical discs) on which this kind of TOC information is recorded, uses the TOC information read into the TOC memory 21 to perform management of the recording regions of the disc and to control recording/playback operations.

And also, in this embodiment, various commands are stored, in the P-TOC sector 1, P-TOC sector 4, or in the U-TOC sector 1, U-TOC sector 4, as character information inputted to go with the pieces of music, and according to these commands stored as TOC information the recording and playback device carries out various operations by control based on interaction between the disc 1 and the user.

The operation of the recording and playback device when various commands are recorded on the disc 1 as character information will now be explained. It is noted that these commands in character string form include those recorded in advance by the disc manufacturer, i.e. those written in the P-TOC sector 1 or sector 4, and those commands recorded by the user, i.e. those written in the U-TOC sector 1 or sector 4, and that the commands discussed hereinafter may be either of these two classes.

In cases where the commands are written in by the user, this inputting is performed using the ten keys 61, in the same way as when titles to go with pieces of music are inputted.

Commands recorded as character information include commands for controlling the recording, playback and editing operations of the minidisc recording and playback device, and commands for displaying characters and images on the display section 20; operation control system commands such as those for outputting alarm sounds and chime sounds, etc., as audio output; input process system commands for reading in operations of the keys by the user from the operation input section 19, or detecting the presence/absence or the volume level of audio signals such as microphone inputs (for example the terminal 17 or a dedicated microphone line not shown in the drawings); and computation processing system commands such as commands for controlling the prescribed computing processing, i.e. variable substitution, numerical logic computation, built-in function computation, and process flow; and these various types of command are established in advance. So-called interactive mode processing is realized by means of these commands.

Below, as an example, it is supposed that, as shown in FIG. 8, a total of ten pieces of music, including five fun pieces of music denoted as FUN and five sad pieces of music denoted as SAD are recorded on the disc 1. The operation in the case when the commands shown below in square brackets are recorded as character information in the P-TOC sector 1 or in the U-TOC sector 1, in the parts tables in which the disc title, etc., is usually recorded (in the disc title area, i.e. in the 76th and 77th line areas of the sectors of FIGS. 4 and 6 and areas linked to these areas), and in the parts tables led to by the table pointers P-TNA1~P-TNA10 corresponding to the first to the tenth pieces of music, will be explained. It will be supposed that the setup is such that the parts tables (01)~(10) are led to by the table pointers P-TNA1~P-TNA10.

* disc title area
  [PRINT A:FUN B:SAD :IF BUTTON A THEN TNO1 BUTTON B THEN TNO2]
* parts table (01)
  [IF END THEN TNO3]
* parts table (02)
  [IF END THEN TNO4]
* parts table (03)
  [IF END THEN TNO5]
* parts table (04)
  [IF END THEN TNO6]
* parts table (05)
  [IF END THEN TNO7]
* parts table (06)
  [IF END THEN TNO8]
* parts table (07)
  [IF END THEN TNO9]
* parts table (08)
  [IF END THEN TN10]
* parts table (09)
  [IF END THEN TN01]
* parts table (10)
  [IF END THEN TN02]

The contents of these commands are as follows:

In the disc name area, first, as an operation of the recording and playback device, a command instructing the recording and playback device to display the characters A: FUN B: SAD is shown, and, following that, a command ordering track number 01, i.e. the first piece of music, to be played if the A button (the interaction key 65) is operated, and a command ordering track number 02, i.e. the second piece of music, to be played if the B button (the interaction key 66) is operated, are shown.

In the parts tables corresponding to the subsequent pieces of music, the piece of music that should be played next when the end of a piece of music is reached is specified in the parts table for that piece of music. In other words, in the parts table corresponding to the first piece of music it is indicated that the third piece of music should be played next, in the parts table corresponding to the second piece of music it is indicated that the fourth piece of music should be played next, in the parts table corresponding to the third piece of music it is indicated that the fifth piece of music is to be played next, and in this way the pieces of music to be played consecutively up to the tenth piece are specified. That is, in this case, the setting is such that when one fun piece of music finishes another fun piece of music is played, and when one sad piece of music finishes another sad piece of music is played.

In the recording and playback device 30 of this embodiment, when the disc 1 is loaded into the recording and playback device and the TOC information is read in from the disc 1, these commands are read in, and when the system is set to the interactive mode, the system controller 11 performs operations according to these commands.

In other words, normally (after the power is switched on), the recording and playback device 30 executes recording/playback operations as a minidisc recording and playback device, but when the user operates the interactive mode key 64, the system controller 11 shifts into interactive mode processing, and the various control processes are executed according to the commands described above.

When the system controller 11 is put into the interactive mode, and when the above commands have been read in from the disc 1, first, based on the commands recorded in the disc name area, the disc controller 11 causes the characters A: FUN B: SAD to be displayed on the display 20.

Then, at this point, the recording and playback device stands by and waits for the user to operate a key.

The user then pushes button A (interaction key 65) when he wants to listen to fun pieces of music and button B (interaction key 66) when he wants to listen to sad pieces of music.

When the A button 65 is pushed, the system controller 11 moves into the playback of the first piece of music according to the commands. That is, the optical head 3 is caused to access the start address shown in the parts table led to by the table pointer P-TNO1 in the P-TOC sector 0 or the U-TOC sector 0, and playback is performed until the end address of that piece of music is reached.

At this point the system controller 11 takes in the commands recorded to go with the first piece of music and acts on those instructions. In other words, because in this instance the third piece of music is specified to follow the first piece of music, when the playback of the first piece of music is completed, the start address of the third piece of music is determined from the TOC information, and the third piece of music is accessed and played. And, similarly, after the third piece of music has been played, playback of the fifth piece of music is started according to the command recorded to go with the third piece of music. And so on and so forth, playback of the fifth piece the seventh piece the ninth piece the first piece the third piece . . . . is executed, i.e. just the fun pieces of music are played.

On the other hand, when the user wants to hear some sad songs and has pushed the B button 66, the system controller 11 moves into the playback of the second piece of music according to the command. That is, the optical head 3 is caused to access the start address shown in the parts table led to by the table pointer P-TNO2 in the P-TOC sector 0 or the U-TOC sector 0, and playback is performed until the end address of that piece of music is reached.

The system controller 11 then takes in the commands recorded to go with the second piece of music and acts on those instructions. In other words, because in this instance the fourth piece of music is specified to follow the second piece of music, when the playback of the second piece of music is completed, the start address of the fourth piece of music is determined from the TOC information, and the fourth piece of music is accessed and played. And, similarly, after the fourth piece of music has been played, playback of the sixth piece of music is started according to the command recorded to go with the fourth piece of music. And so on and so forth, playback of the sixth piece the eighth piece the tenth piece the second piece the fourth piece . . . is executed, i.e. just the sad pieces of music are played.

For example as described above, according to commands recorded on the disc 1, an interactive playback operation control is realized by the recording and playback device 30 through interaction between the user and the disc 1.

Referring to FIG. 9, a portion of the UTOC sector is illustrated, showing recorded program information. In this case, the program is "IF END THEN TN03". The program begins on line 80, corresponding for example of a line 80 of the UTOC sector as shown in FIG. 6, and extends through lines 81, and 84–86. Lines 80 and 81 are used as well as lines 84–86. Line 81 includes a link headdress pointing to line 84, where the program resumes. The last of the character in 86 is 00h, indicating the end of the program.

FIG. 10 illustrates a program executed by the system control 11, when it is desired to write the program illustrated in FIG. 9. In step 80, the disc is inserted, and then the operator pushes the push button 64, as shown in step 82. Then disc name button 58 is pushed, in step 84, and then in step 86, the program entered "IF A THEN TNO1 B THEN TNO2". This is done using the numeral keys 61. Then the enter button 63 is pressed, in step 88, and in step 90, the recording is made on the UTOC sector. Then in step 92, the AMS key 55 is used to select track 1. Then in step 94, the program is entered "IF END THEN TNO3", using the numeral keys 61. Then the enter button 63 is pressed in step 96, to record the program. In step 98, track 2 is selected, using the AMS key 55, and then in step 100, a different program is entered, namely "IF END THEN TNO4". Then the enter button 63 is pushed again in step 102. The process is completed until programming is complete, when the step 104 is reached.

FIG. 11 shows a flow chart of the process for executing the program recorded on the disc. In step 110, the disc is inserted, and in step 112, the operator presses the push button 64. In step 114, the information is reproduced from the UTOC sector, and control is passed to a unit 136, which determines whether the A push button 65 has been depressed. If not, control passes to the unit 118, which determines whether the B push button 66 has been depressed. If not, controller returns to unit 116, until one of the two push buttons is depressed.

When the A push button is found depressed, control passes to unit 120, which reads the program of TNO1 from the UTOC sector. Then unit 122 reproduces the track 1, and passes control to unit 124. Unit 124 retains control until TNO1 ends, after which control is passed to the end of the program at 126.

If the B push button is depressed, control passes from unit 118 to unit 128, which reads the program TNO2 from the UTOC. Then unit 130 reproduces track 2, and unit 132 receives control until TNO2 ends, after which control passes to the end unit 126. The commands and the operations based on these commands used in this example are quite simple, but of course many and various different interactive controls are possible, according to the command setting and recording capacity.

For example, music software such as that in which the disc manufacturer sets a number of different song sequences in addition to the normal song sequence of the pieces of music recorded and the user is allowed to select from these alternatives, or for example music software which performs a predetermined display, based on commands, matched to the musical performance, or prompts user operations during playback and makes possible predetermined responses, and changes the playback sequence or the playback state, etc., according to key operations or a microphone input, can be realized.

Furthermore, applications such as learning aids and quizzes using music can also be realized, and it is possible for buzzer sounds or chime sounds to be outputted in response to key input or microphone input from the user (for example, the input of answers to quiz questions).

And, when it has been made possible for the user to write in commands, the user himself can set up desired operations, and the scope of application is widened further.

It is noted that although it was an embodiment as a recording and playback device that was presented as an example of a device for use with the recording medium of the embodiment, the device may instead be a playback-only device. And, the device may be a recording-only device, which performs audio data recording through interaction.

Also, this invention is not limited to minidisc systems and can be applied to any system in which character information can be recorded/reproduced in correspondence with audio data.

As described above, according to the present invention, by recording character information, to serve as commands, on a recording medium, and by a recording device or a recording/playback device being constructed in such a way as to perform processing according to these commands, so-called interactive operation is made possible, and there is the benefit that an audio/music system in which a wide variety of operations based on interaction with the user are possible can be constructed.

We claim:

1. A recording/reproduction device for use with a recording medium on which management information for managing recording/playback operations is recorded together with one or a plurality of units of audio information, the recording medium being further provided with a character recording region for management information, in which character information can be recorded, wherein predetermined character string information is recorded as commands in this character recording region, the recording/reproduction device comprising:

command read-in means, for reading in character string information recorded as commands on the recording medium from the recording medium;

control means, for, according to the character string information read in by the command read-in means, controlling the execution of those indicated operations; and input/output means, controlled by the control means, required for executing the operations specified by the read-in character string information.

2. A reproduction device for reproducing from a recording medium on which at least one unit of audio information and management information for managing the audio information is recorded on respective program and management areas, a character string information area provided in the management area for displaying the title of the audio information, the reproducing device comprising:

a command readout means for reading out the character string information from the management area;

decoding means for decoding the character string information as a command; and control means for controlling reproduction operation in accordance with the decoded character string information from the decoding means to achieve interactive operation.

3. A recording/reproducing device for recording/reproducing at least one unit of audio information and management information for managing the audio information to/from a program area and management area of a recording medium respectively, a character string information area provided with the management area for displaying a title of the audio information, the recording device comprising:

input means for inputting the character string information by a user;

encoding means for encoding the character string information as a command;

command recording means for recording the encoded character string information in the management area;

a command readout means for reading out the character string information from the management area;

a decoding means for decoding the character string information as a command;

a control means for controlling reproduction operation in accordance with the decoded character string information from the decoding means to achieve interactive operation.

* * * * *